United States Patent
Morita et al.

(10) Patent No.: US 7,132,196 B2
(45) Date of Patent: Nov. 7, 2006

(54) BATTERY PACK

(75) Inventors: Hideyo Morita, Mihara-gun (JP); Yasuhiro Oono, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 570 days.

(21) Appl. No.: 10/606,737

(22) Filed: Jun. 27, 2003

(65) Prior Publication Data

US 2004/0142239 A1    Jul. 22, 2004

(30) Foreign Application Priority Data

Jun. 28, 2002    (JP) ............................. 2002/191441

(51) Int. Cl.
*H01M 2/02*    (2006.01)
*H01M 2/30*    (2006.01)

(52) U.S. Cl. ..................... 429/178; 429/162; 429/180

(58) Field of Classification Search ..................... None
See application file for complete search history.

(56) References Cited

U.S. PATENT DOCUMENTS 6,218,041 B1 *  4/2001  Barbier et al. ................. 429/96
6,319,630 B1 * 11/2001  Hasegawa et al. ........... 429/162
6,451,474 B1 *  9/2002  Kozu et al. .................. 429/100
6,924,059 B1 *  8/2005  Kawakami et al. .......... 429/162

FOREIGN PATENT DOCUMENTS

JP    11-111250    4/1999

* cited by examiner

*Primary Examiner*—John S. Maples
(74) *Attorney, Agent, or Firm*—Wenderoth, Lind & Ponack, L.L.P.

(57) ABSTRACT

A battery pack includes a laminate battery having a built-in electrode held inside thereof by connecting a first sheathing film and a second sheathing film at lap sections thereof along outer peripheries of the electrode. A terminal substrate is disposed at the lap section and includes output terminals at a front surface side thereof. A substrate holder is disposed between a rear surface of the terminal substrate and the lap section, and a first metal plate is laminated on a first sheathing film side of the laminate battery. In the battery pack, the terminal substrate is supported by the substrate holder, the lap section, and the first metal plate, and the output terminals of the terminal substrate are disposed at positions so as to be brought closer to the same plane as a front surface of the second sheathing film.

24 Claims, 9 Drawing Sheets

BATTERY PACK

This application is based on Application No. 2002-191441 filed in Japan on Jun. 28, 2002, the content of which is incorporated hereinto by reference.

BACKGROUND OF THE INVENTION

The present invention relates to a battery pack including a polymer battery.

Figure 1:
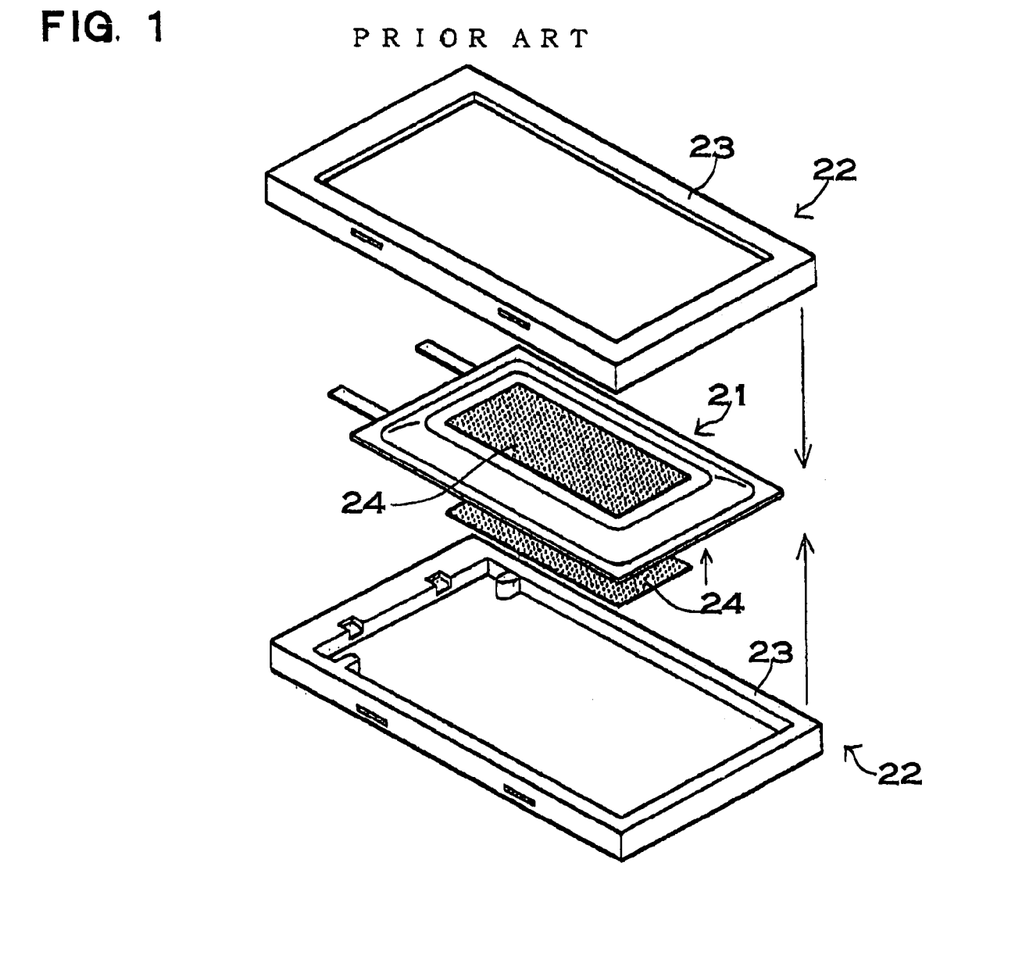
FIG. 1 is an exploded perspective view of a related art battery pack.
Figure 2:
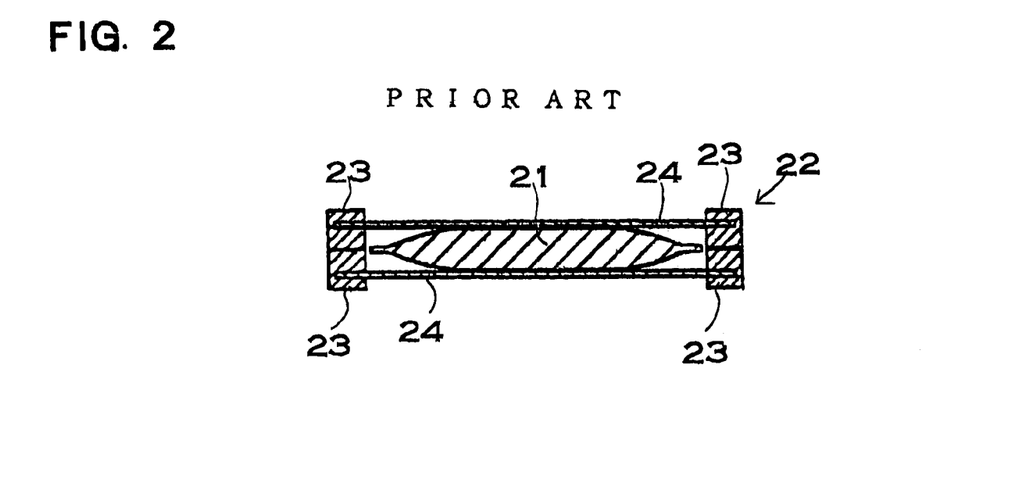
FIG. 2 is a sectional view of the battery pack shown in FIG. 1.
Figure 3:
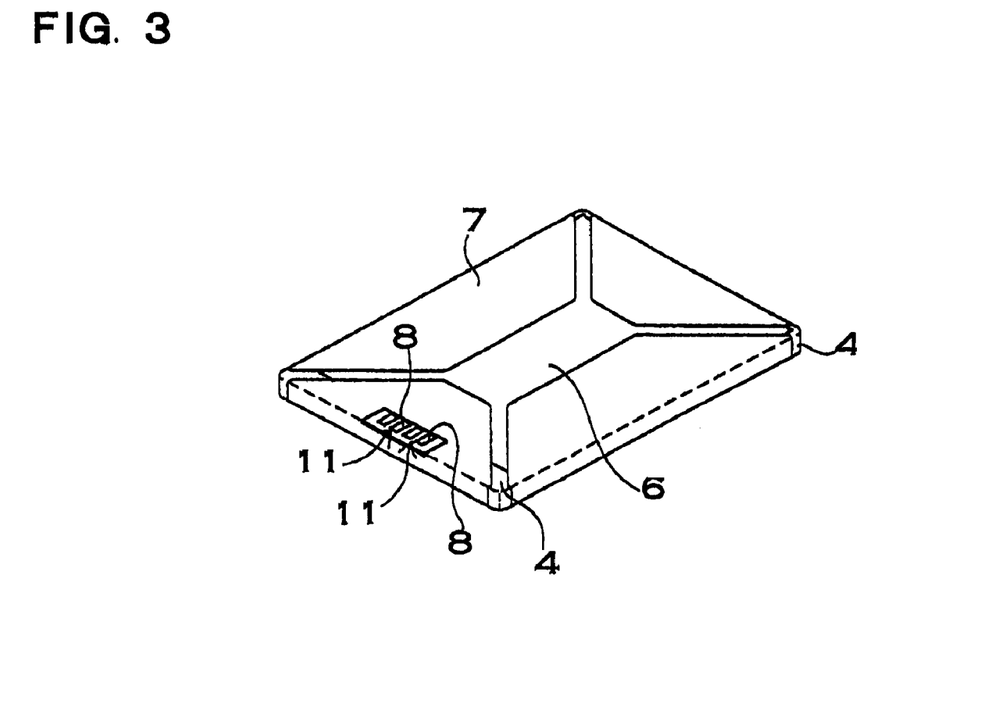
FIG. 3 is a perspective view of a battery pack according to an embodiment of the invention.
Figure 4:
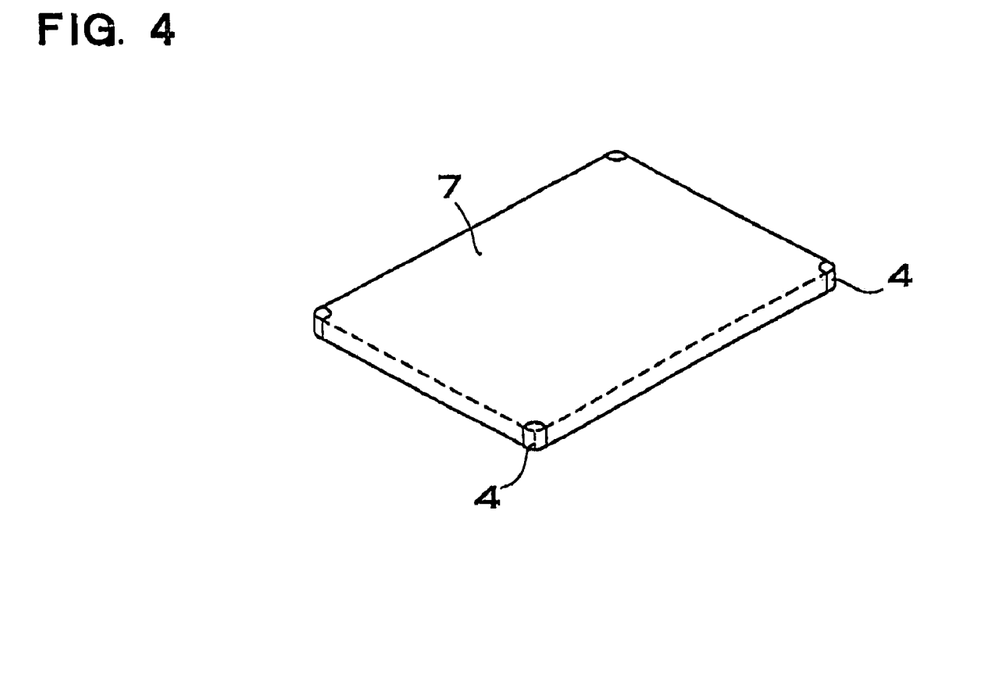
FIG. 4 is a perspective view of the battery pack shown in FIG. 3, as seen from a bottom thereof.

A polymer battery is manufactured by laminating sheathing films on both surfaces of an electrode and airtightly connecting the sheathing films at a circumference of the electrode. The polymer battery with this structure has an advantageous feature in that the polymer battery can be made thinner and bigger as compared to a battery in which an electrode is inserted in a metal sheathing case. However, the polymer battery has a drawback due to the lack of the metal sheathing case. Namely, since the strength of the sheathing film is weaker than the metal case, a front surface of the polymer battery is more likely to be damaged. In order to solve this adverse effect, there has been developed a battery pack in which a polymer battery is encased in a sheathing case as disclosed in Japanese Unexamined Patent Publication (KOKAI) No. 11-111250, the content of which is incorporated hereinto by reference. In the battery pack disclosed in this publication, as shown in FIG. 1 and FIG. 2, a polymer battery 21 is stored in upper and lower cases 22. The upper and lower cases 22 are manufactured by inserting metal plates 24 into plastic frames 23.

In the battery pack with the aforementioned structure, although both surfaces of the polymer battery can be protected by the metal plates, there is a drawback in that the overall battery pack becomes thick. Since it is important that the polymer battery can be made thin, if the overall thickness is increased, there is the drawback of losing the valuable and excellent advantageous feature thereof. Namely, among thin batteries manufactured by inserting electrodes into metal sheathing cases, for example, lithium ion rechargeable batteries or the like, there has been developed a thin battery having a thickness of only 3.8 mm. In view of the foregoing, it is especially important for the battery pack with the polymer battery to be made as thin as possible.

Further, it is also important for the battery pack with the polymer battery to provide solid output terminals while being made thin as a whole. When the battery pack is mounted on an electrical device, terminals of the electrical device side are elastically pressed against the output terminals, so that a solid structure is required so as not to be deformed. Since the polymer battery has the structure in which lap sections of the sheathing films are bonded at the periphery of the electrode, it is difficult to securely hold the output terminals. Especially, it is difficult to solidly hold the output terminals while the battery pack is made thin. This is because the strength of the lap section is not made sufficient if the output terminals are disposed at the lap section in order to make the battery pack thinner.

The present invention has been developed in order to solve the aforementioned drawbacks. An important object of the present invention is to provide a battery pack including a polymer battery, in which output terminals can be securely supported while the overall battery pack is made thin, and the strengths of both surfaces of the battery pack can be improved.

The above and further objects and features of the invention will more fully be apparent from the following detailed description with accompanying drawings.

SUMMARY OF THE INVENTION

A battery pack of the present invention includes a laminate battery, a terminal substrate, a substrate holder, and a first metal plate. In the laminate battery, by interposing an electrode between a first sheathing film and a second sheathing film, the first sheathing film and the second sheathing film are lapped along an outer periphery of the electrode, and lap sections of the films are connected to hold the electrode therein. The terminal substrate includes output terminals at a front surface side thereof, and is disposed at the lap sections of the laminate battery. The substrate holder is disposed between a rear surface of the terminal substrate and the lap sections of the laminate battery. The first metal plate is laminated on a first sheathing film side of the laminate battery. In the battery pack, the terminal substrate is supported by the substrate holder, the lap sections, and the first metal plate, and by means of the substrate holder, the output terminals of the terminal substrate are placed at a position to be brought closer to the same plane as a front surface of a second sheathing film.

The battery pack with the laminate battery structured as described above has an advantageous feature in that the output terminals can be solidly supported while the overall battery pack is made thin and the strength of the front surface of the laminate battery can be improved.

In the battery pack of the invention, the lap sections of the laminate battery located at both sides of the electrode are bent along end surfaces of the electrode, and the laminate battery is fittingly inserted into a plastic frame having two open surfaces, so that the framed battery unit can be formed. In this battery pack, both surfaces of the framed battery unit are covered with the first metal plate and the second metal plate. The plastic frame is provided with a cover frame for covering the front surface side of the terminal substrate, and contact windows for showing or exposing the output terminals outside can be bored in the cover frame.

In the battery pack, the laminate battery is inserted into the plastic frame having both open surfaces to thereby form the framed battery unit, and both surfaces of the framed battery unit are covered by the metal plates. Therefore, the battery pack has an advantage of achieving an extremely strong structure as a whole. Especially, since the metal plates are laminated on both surfaces of the laminate battery, the strengths of both the surfaces of the laminate battery can be significantly improved.

Further, in the battery pack of the invention, any one of or both of the first metal plate and the second metal plate can be provided with side walls for covering one side or both sides of the framed battery unit. An end section of the first metal plate can be provided with channel-form bent sections formed by being bent into a U-shaped form, and the framed battery unit can be fitted into the channel-form bent sections. Furthermore, side walls provided at both sides of the first metal plate can be bent into the U-shaped form, and both sides of the framed battery unit can be fitted into the side walls of the first metal plate. Also, in the battery pack of the invention, the first metal plate can be provided with the side walls for covering both sides of the framed battery unit and the channel-form bent sections for covering one end of the framed battery unit, and the second metal plate can be provided with a vertical wall for covering the other end of the framed battery unit, such that both sides, one end, and the other end of the framed battery units can be surrounded by the side walls, the channel-form bent sections, and the vertical wall, respectively. Still further, in the battery pack of the invention, four corners of the plastic frame can be exposed or shown at four corners of the framed battery unit formed by covering both sides thereof with the first metal plate and the second metal plate. A label can be bonded to front surfaces of the first metal plate and the second metal plate.

DETAILED DESCRIPTION OF THE INVENTION

A battery pack shown in FIG. 3 to FIG. 11 includes a polymer battery 1, 81, 101, 111; a terminal substrate 2, 82 disposed at a lap section 1a of the polymer battery 1, 81, 101, 111; a substrate holder 3, 83 provided between the terminal substrate 2, 82 and the lap section 1a, 81a; a plastic frame 4, 84, 104, 114 in which the polymer battery 1, 81, 101, 111 is fittingly inserted; a first metal plate 5, 85, 105, 115 and a second metal plate 6, 86, 106, 116 which cover both surfaces of the polymer battery 1, 81, 101, 111; and a label 7, 87, 107, 117 which adheres to the front surfaces of the metal plates.

Figure 7:
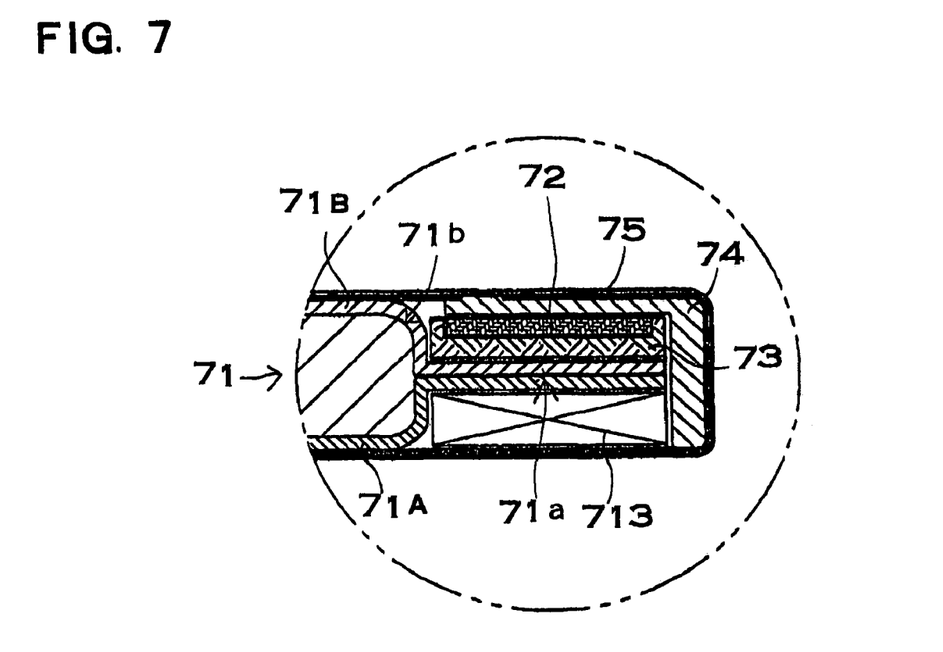
FIG. 7 is an enlarged sectional view of an end section of a battery pack according to another embodiment of the invention.

In the following embodiments, structural elements which are the same as in embodiments shown in FIGS. 3 through 6, are numbered the same lower order digits in embodiments shown in FIGS. 7 through 9 except for the highest order digit, and in embodiments shown in FIGS. 10 through 11 except for the two highest order digits, their description is abbreviated.

In the polymer battery 1, 81, an electrode is sandwiched between a first sheathing film 1A, 81A and a second sheathing film 1B, 81B, and the first sheathing film 1A, 81A and the second sheathing film 1B, 81B are lapped at an outer periphery of the electrode to thereby connect lap sections 1a, 81a so that the electrode is built inside the polymer battery 1, 81. The polymer battery 1, 81 shown in the drawing has a quadrangular shape, and both sides thereof and one of end sections thereof are provided with the lap sections 1a, 81a of the sheathing films. The first sheathing film 1A, 81A and the second sheathing film 1B, 81B are airtightly combined at the lap sections 1a, 81a by a method such as adhering and welding. In the polymer battery 1, 81 shown in the drawing, one sheet of the sheathing film is folded over at one side of the electrode, resulting in that a portion thereof covering one surface of the electrode constitutes the first sheathing film 1A, 81A and a surface thereof covering the other surface of the electrode constitutes the second sheathing film 1B, 81B. In the polymer battery 1, 81 with this structure, since the sheathing film is folded over along one side of the electrode, there is no lap section at the aforementioned one side of the electrode, and three sides of the electrode constitute the lap sections 1a, 81a. Although not shown in the drawings, the polymer battery may have a structure in which the lap sections are provided at outer peripheries of the four sides thereof. This polymer battery 1, 81 is manufactured by laminating two sheets of sheathing films separated on both surfaces of the electrode and connecting these films at the laps sections provided at the four sides surrounding the electrode.

In the polymer battery 1, 81 shown in the drawing, the first sheathing film 1A, 81A has a planate form. In order to make the first sheathing film 1A, 81A planate, the second sheathing film 1B, 81B is bent along the periphery of the electrode and combined with the first sheathing film 1A, 81A at the lap sections 1a, 81a. As shown in the sectional view in FIG. 6, in the polymer battery 1, only one of the lap sections 1a is provided with the substrate holder 3 and the terminal substrate 2, so that the lap section 1a has the same thickness as that of an electrode storing section 1b. Incidentally, as shown in the sectional view in FIG. 7, a battery pack of the invention can be configured to have a polymer battery 71 in which both the first sheathing film 71A and the second sheathing film 71B are bent along the electrode. In this battery pack, a front surface side of the lap section 71a is provided with the substrate holder 73 and the terminal substrate 72 such that output terminals 78 are placed on the same plane as the electrode storing section 71b, and a spacer 713 is disposed at a rear surface of the lap section 71a to thereby reinforce the lap section 71a.

In the polymer battery 1, 81 in the drawing, the lap sections 1a, 81a located at both sides of the electrode are folded along end surfaces of the electrode. In this polymer battery 1, 81, since the lap sections 1a, 81a are not protruded at both sides, the width of the polymer battery 1, 81 can be made smaller. Also, the folded lap sections 1a, 81a at both sides function as reinforcing ribs for preventing the lap section 1a, 81a provided with the output terminals 8, 88 from bending, so that this portion can be reinforced. Also, there is an advantageous feature in that the polymer battery can be attached to inner surfaces of the plastic frame 4 without creating a wasted clearance.

In the polymer battery 1, 81, positive and negative output leads 9, 89 are disposed at the lap section 1a, 81a in which the output terminals 8, 88 are provided. Although not shown in the drawings, the output leads 9, 89 are airtightly sandwiched between the first sheathing film 1A, 81A and the second sheathing film 1B, 81B, and pulled out to the outside. The output leads 9, 89 are connected to the output terminals 8, 88 of the battery pack via a protective component 10, 810. The polymer battery 1, 81 is fittingly inserted into the plastic frame 4, 84, to thereby be assembled as a framed battery unit 12, 812.

The terminal substrate 2, 82 is disposed at the lap section 1a, 81a of the polymer battery 1, 81 so as to prevent the incident that the overall battery pack becomes thick in order to provide the output terminals 8, 88. Since the lap section 1a, 81a is located lower than the electrode storing section 1b to constitute a hollow section, the output terminals 8, 88 are disposed by making effective use of this space. The terminal substrate 2, 82 constitutes an insulating substrate, and the output terminals 8, 88 of the battery pack are fixed at an upper surface of the terminal substrate 2, 82. The output terminals 8, 88 are shown outside through contact windows 11, 811 provided at a cover frame 4A, 84A of the plastic frame 4, 84. The output terminals 8, 88 are elastically pressed against terminals of an electric device to which the battery pack is mounted. In order to securely hold the output terminals 8 against the pressing force, the terminal substrate 2, 82 provided with the output terminals 8, 88 is supported by the substrate holder 3, 83, the lap section 1a, 81a and the first metal plate 5, 85. Further, in order to bring the output terminals 8, 88 closer to the same plane as the second sheathing film 1B, 81B, the substrate holder 3, 83 is disposed on a rear surface of the terminal substrate 2, 82.

In the terminal substrate 2, 82, in addition to the output terminals 8, 88, an electronic component for achieving a protective circuit of the polymer battery can be mounted. This electronic component may be fixed so as to protrude at the rear surface of the terminal substrate 2, 82. By providing a hollow section at an upper surface of the substrate holder 3, 83, the electronic component at the rear surface of the terminal substrate 2, 82 can be disposed in this hollow section. The protective circuit constitutes a circuit for controlling charge and discharge currents in order to prevent the polymer battery 1, 81 from overcharging and over-discharging, a circuit for cutting off the current by detecting the over-current, a circuit for cutting off the current when the temperature of the polymer battery 1, 81 is abnormally high, or the like. The terminal substrate 2, 82 has an elongate shape including a width and a length allowing the terminal substrate 2, 82 to be disposed at the lap section 1a, 81a of the polymer battery 1, 81. The terminal substrate 2, 82 in the drawing has a rectangular shape to be fittingly inserted into the lap section 1a, 81a.

Figure 5:
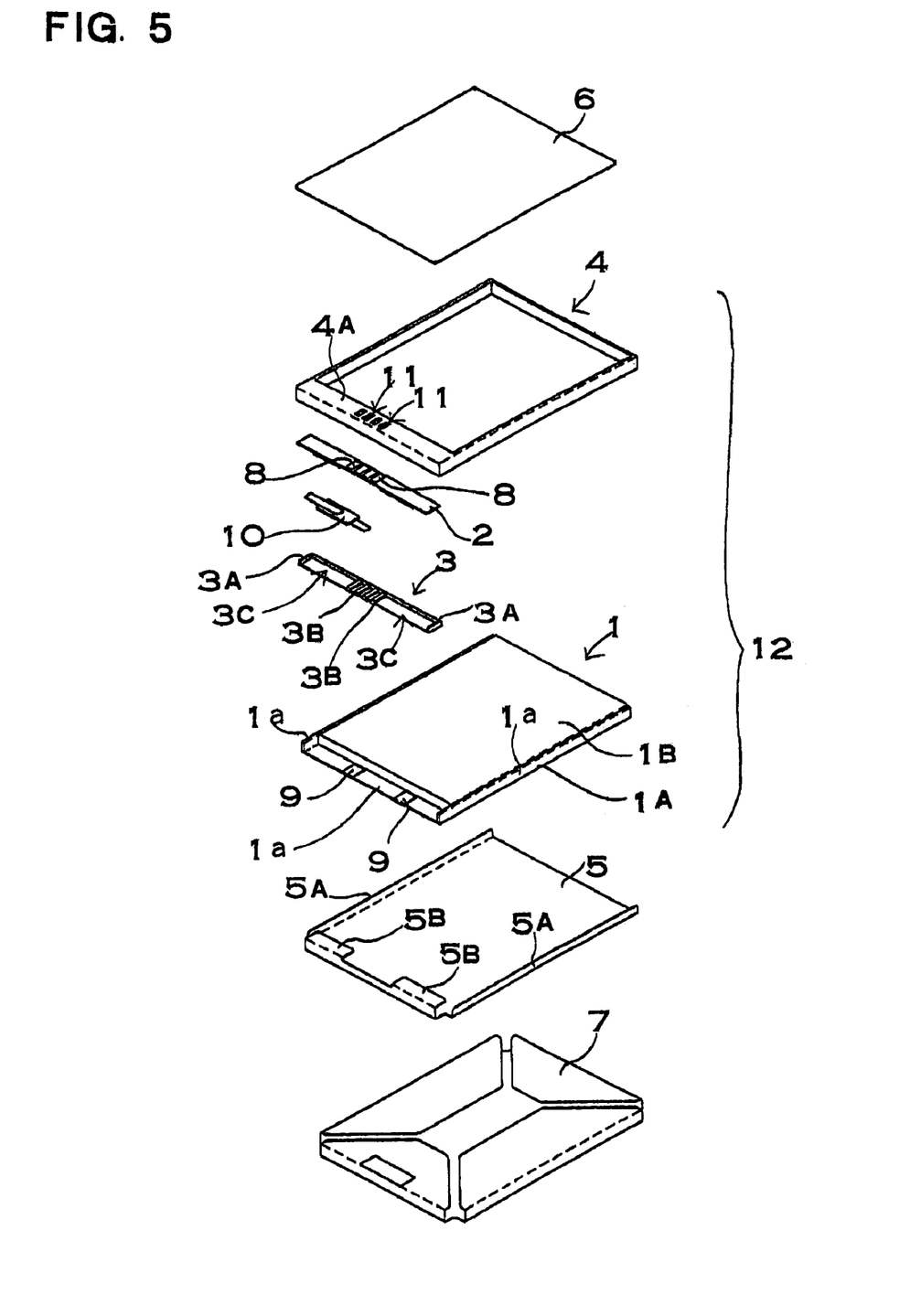
FIG. 5 is an exploded perspective view of the battery pack shown in FIG. 3.
Figure 6:
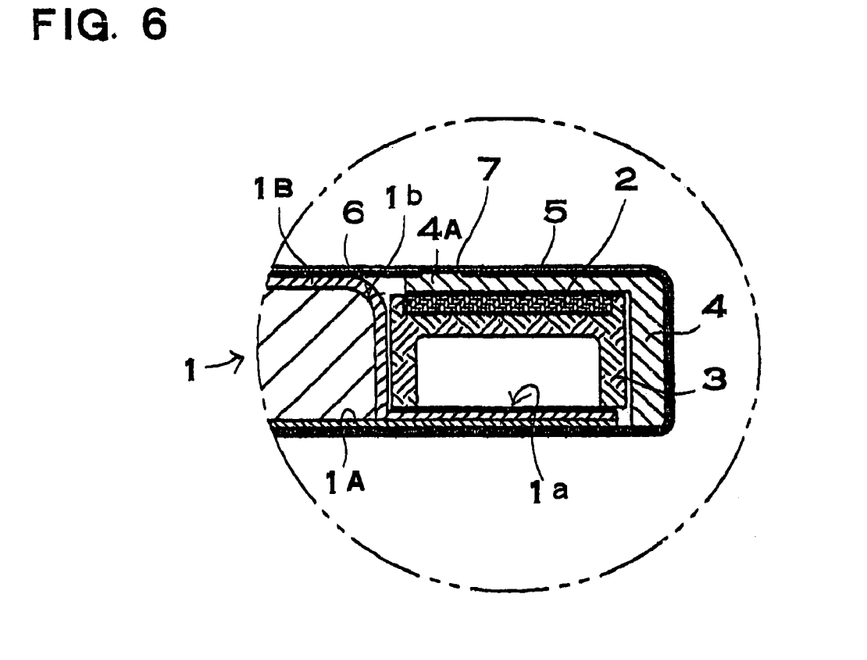
FIG. 6 is an enlarged sectional view of an end section of the battery pack shown in FIG. 3.

The overall substrate holder 3, 83 is formed of a plastic. The substrate holder 3, 83 is disposed between the rear surface of the terminal substrate 2, 82 and the lap section 1a, 81a of the polymer battery 1, 81 so as to make the output terminals 8, 88 closer to the same plane as the front surface of the second sheathing film 1B, 81B. The substrate holder 3, 83 in the drawing is provided with peripheral walls 3A, 83A and protrusions 3B, 83B to thereby increase the substantial thickness of the substrate holder 3, 83, so that the output terminals 8, 88 are placed on the same plane as the second sheathing film 1B, 81B. The protrusions 3B, 83B are provided at a central portion of the substrate holder 3, 83, and the peripheral walls 3A, 83A are provided along both ends and one side rim of the substrate holder 3, 83. A plurality of protrusions 3B, 83B can be provided at the central portion of the substrate holder 3, 83 as shown in FIG. 5, or the wide protrusion 3B, 83B can be provided at the central portion as shown in FIG. 8 and FIG. 9. Since a hollow section 3C, 83C is formed between the protrusion 3B, 83B and the peripheral wall 3A, 83A, the protective component 10, 810 is disposed at the hollow section 3C, 83C in the battery pack shown in the drawings. The protective component 10, 810 constitutes a PTC, a breaker, a fuse, or the like. Furthermore, in the terminal substrate 2, 82 in which the electronic component for achieving the protective circuit is mounted, this electronic component is disposed at the hollow section 3C, 83C formed on the upper surface of the substrate holder 3, 83. The substrate holder 3, 83 is formed into an outline allowing the same to be fitted to the lap section 1a, 81a of the polymer battery 1, 81. The substrate holder 3, 83 shown in the drawings is formed into a rectangle.

The overall plastic frame 4, 84 is formed into a frame form by a plastic. The plastic frame 4, 84 constitutes a frame shape, both surfaces of which are penetrated, and an inner shape of the frame is made into a size for allowing the polymer battery 1, 81 attached with the terminal substrate 2, 82 and the substrate holder 3, 83 to be fittingly inserted therein. Further, in order to prevent the battery pack from becoming thick by providing the frame, the plastic frame 4, 84 is formed to have such a thickness that the plastic frame 4, 84 is placed on the same to substantially the same plane as the front surface of the polymer battery 1, 81, or the plastic frame 4, 84 is positioned lower than the front surface of the polymer battery 1, 81. In the specification of the present invention, the plastic frame being on substantially the same plane as the front surface of the polymer battery means that the plastic frame does not protrude for more than the thickness of the metal plate from the front surface of the polymer battery.

The plastic frame 4, 84 in the drawing is integrally formed with the cover frame 4A, 84A for covering the front surface side of the terminal substrate 2, 82. The cover frame 4A, 84A has an L-shaped form in cross-section, and covers an outer peripheral surface of the framed battery unit 12, 812 and the front surface of the terminal substrate 2, 82. In the cover frame 4A, 84A, the contact windows 11, 811 for showing the output terminals 8, 88 therethrough are opened. Since the battery pack of the drawings is provided with four output terminals 8, 88, four contact windows 11, 811 are bored in the cover frame 4A, 84A.

The first metal plate 5, 85 is laminated on the first sheathing film 1A, 81A side of the polymer battery 1, 81, to thereby protect the rear surface of the polymer battery 1, 81. The first metal plate 5, 85 and the second metal plate 6, 86 constitute SUS304 stainless plate having a thickness of 0.1 mm. This metal plate has an advantageous feature of being thin and extremely strong. Incidentally, the metal plate can be made much thinner or thicker. For example, the thickness of the metal plate can be 0.6 to 0.2 mm. Instead of the stainless, the metal plate can be made of iron, iron alloy, aluminum, or aluminum alloy.

Figure 8:
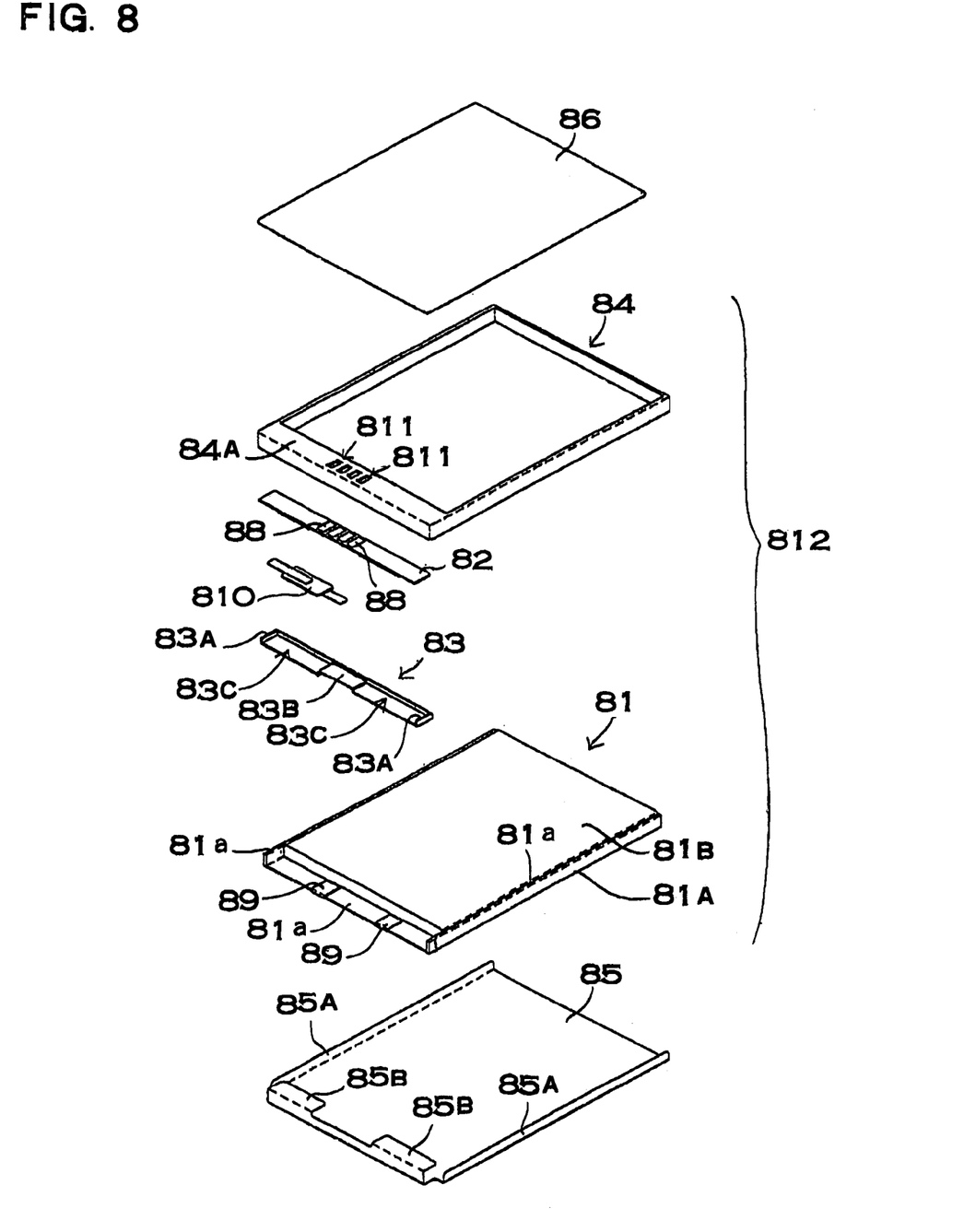
FIG. 8 is an exploded perspective view of a battery pack according to still another embodiment of the invention.
Figure 9:
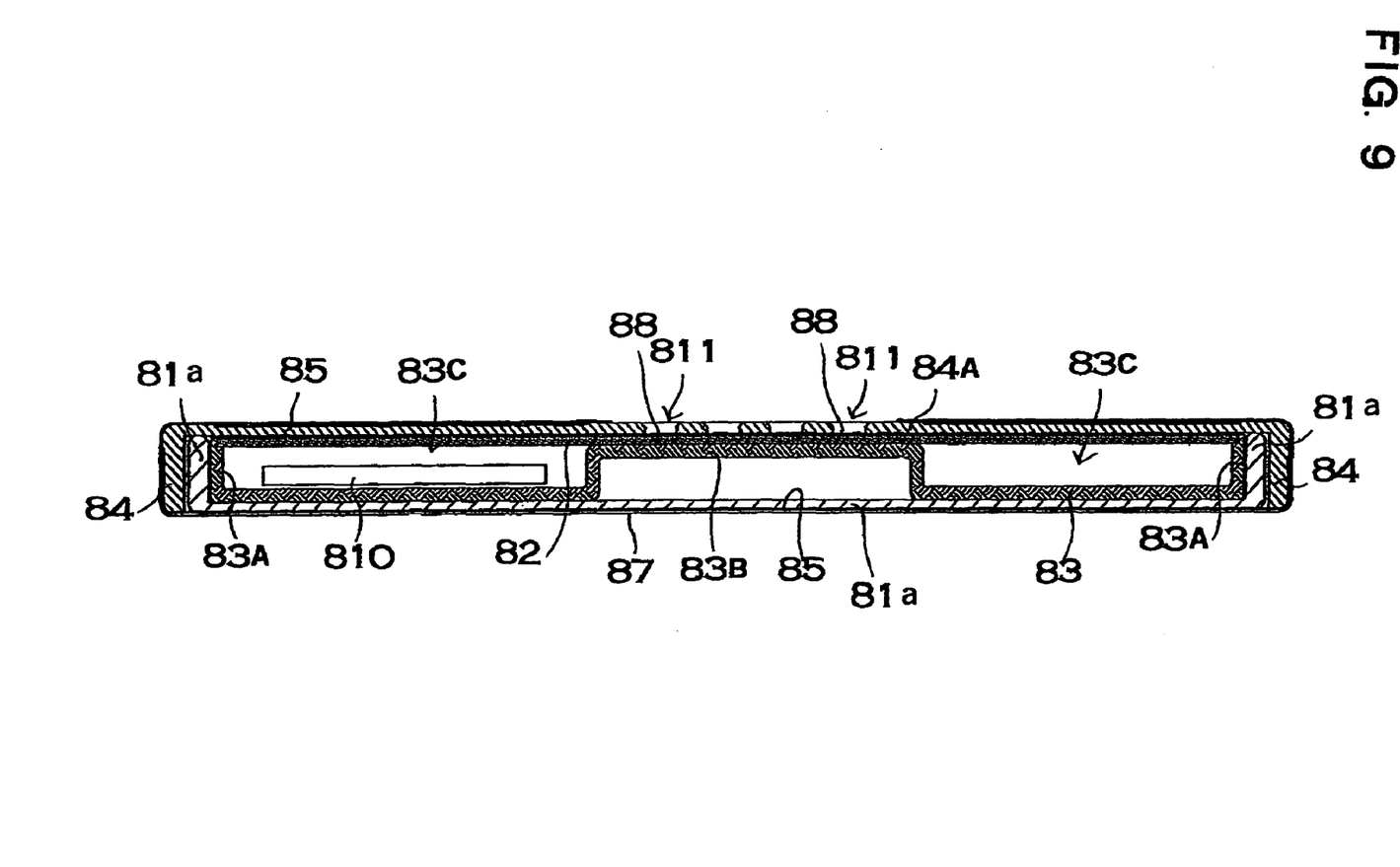
FIG. 9 is a cross-sectional view of an end section of the battery pack shown in FIG. 8.

In the first metal plate 5, 85 of the battery pack shown in FIG. 5 and FIG. 8, both sides thereof are bent-up into an L-shaped form, to thereby provide side walls 5A, 85A for covering both sides of the framed battery unit 12, 812. In the first metal plate 105, 115 shown in FIG. 10 and FIG. 11, the side walls 105A, 115A are folded into a U-shaped form, and both sides of the framed battery unit 1012, 1112 are fittingly inserted to the side walls 105A, 115A. The side walls 5A, 85A, 105A, 115A provided at both sides of the first metal plate 5, 85, 105, 115 function as the reinforcing ribs, to thereby prevent the metal plate from bending. Therefore, the strong structure can be achieved by using the extremely thin metal plate. Especially, as shown in FIG. 10 and FIG. 11, the side walls 105A, 115A bent into the U-shaped form can securely protect both sides of the framed battery unit 1012, 1112 by fittingly inserting the framed battery unit 1012, 1112 thereinto.

Furthermore, channel-form bent sections 5B, 85B, 105B, 115B folded in a U-shaped form are provided at one end of the first metal plate 5, 85, 105, 115. The framed battery unit 12, 812, 1012, 1112 is fittingly inserted into these channel-form bent sections 5B, 85B, 105B, 115B. The cover frame 4A, 84A, 104A, 114A of the plastic frame 4, 84, 104, 114 is fitted with the channel-form bent sections 5B, 85B, 105B, 115B. The contact windows 11, 811, 1011, 1111 are perforated in the cover frame 4A, 84A, 104A, 1104A, to show or expose the output terminals 8, 88, 108, 118 outside therethrough. Therefore, the channel-form bent sections 5B, 85B, 105B, 1105B are not disposed at a portion provided with the contact windows 11, 811, 1011, 1111, that is, a portion where the output terminals 8, 88, 108, 118 are shown or exposed outside, but disposed at both sides of this portion.

In the first metal plate 5, 85, 105, 115 shown in the drawings, both sides thereof are provided with the side walls 5A, 85A, 105A, 115A for covering both sides of the framed battery unit 12, 812, 1012, 1112, and one end section of the first metal plate 5, 85, 105, 115 is provided with the channel-form bent sections 5B, 85B, 105B, 115B, so that the flexural strength can be extremely improved by the side walls 5A, 85A, 105A, 115A and the channel-form bent sections 5B, 85B, 105B, 115B. This is because the flexural strengths in all directions can be improved since the side walls 5A, 85A, 105A, 115A and the channel-form bent sections 5B, 85B, 105B, 115B prevent bending in the intersecting or crisscross directions of the first metal plate 5, 85, 105, 115. Incidentally, in the battery pack of the invention, it is not always necessary to provide the side walls and channel-form bent sections in the first metal plate, and for example, although not shown in the drawings, the first metal plate may be provided with the channel-form bent sections only, and the second metal plate may be provided with the side walls. Furthermore, the side walls may be provided on one side of the first metal plate and in one side of the second metal plate.

The second metal plate 6, 86, 106, 116 is laminated on the second sheathing film 1B, 81B, side of the polymer battery 1, 81, 101, 111, to thereby protect the front surface of the polymer battery 1, 81, 101, 111. In the pack battery in the drawings, since both surfaces of the polymer battery 1, 81, 101, 111 are protected by the first metal plate 5, 85, 105, 115 and the second metal plate 6, 86, 106, 116, damage to both surfaces of the polymer battery 1, 81, 101, 111 can be prevented. Incidentally, the battery pack of the invention can be provided with the first metal plate only, so that only one surface of the polymer battery is protected by the metal plate. The battery pack of this structure can be used for the one which is mounted to the electrical device in a state that the surface protected by the metal plate is shown or exposed to the outside.

Figure 10:
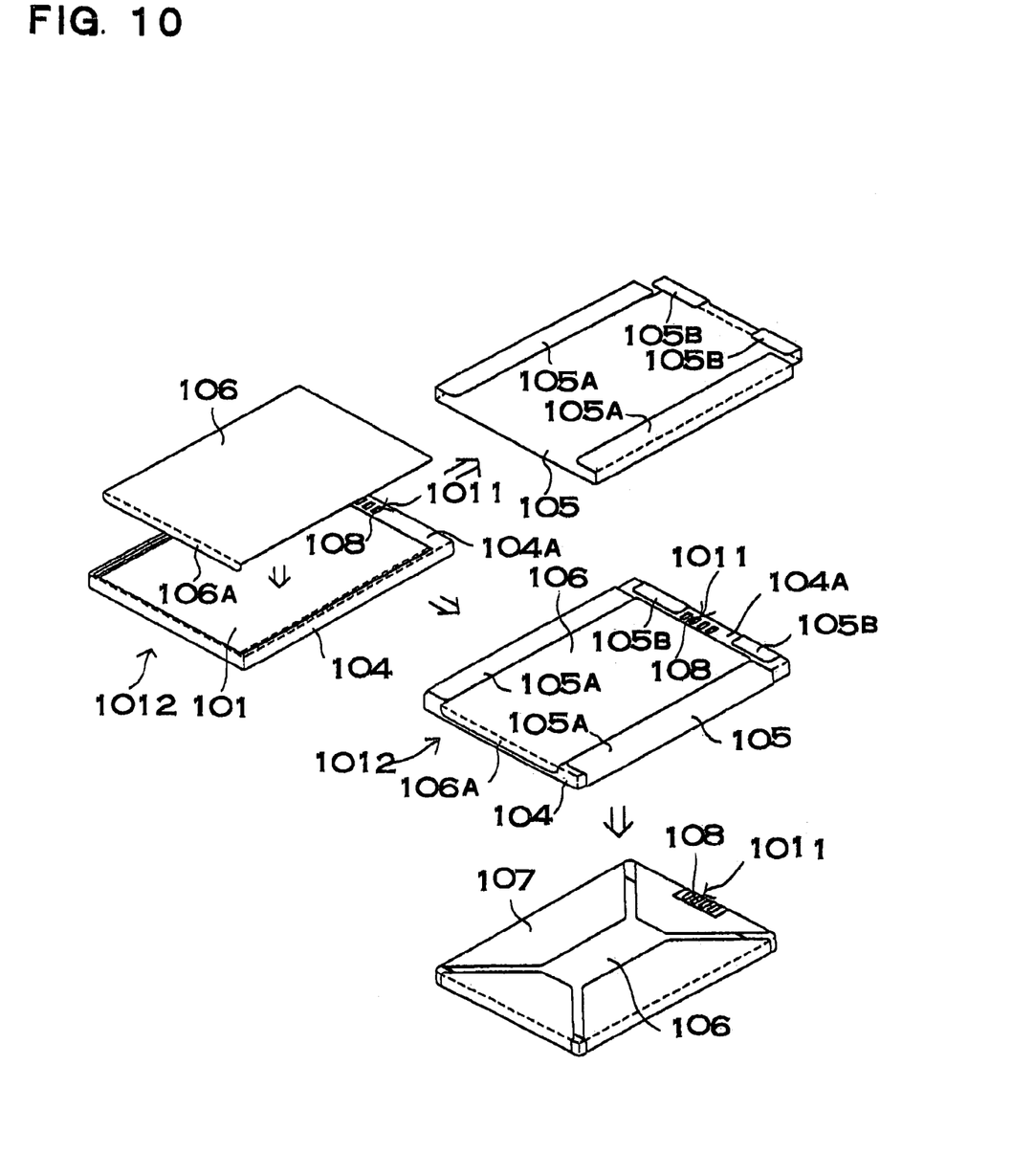
FIG. 10 is an exploded perspective view of a battery pack according to still another embodiment of the invention.
Figure 11:
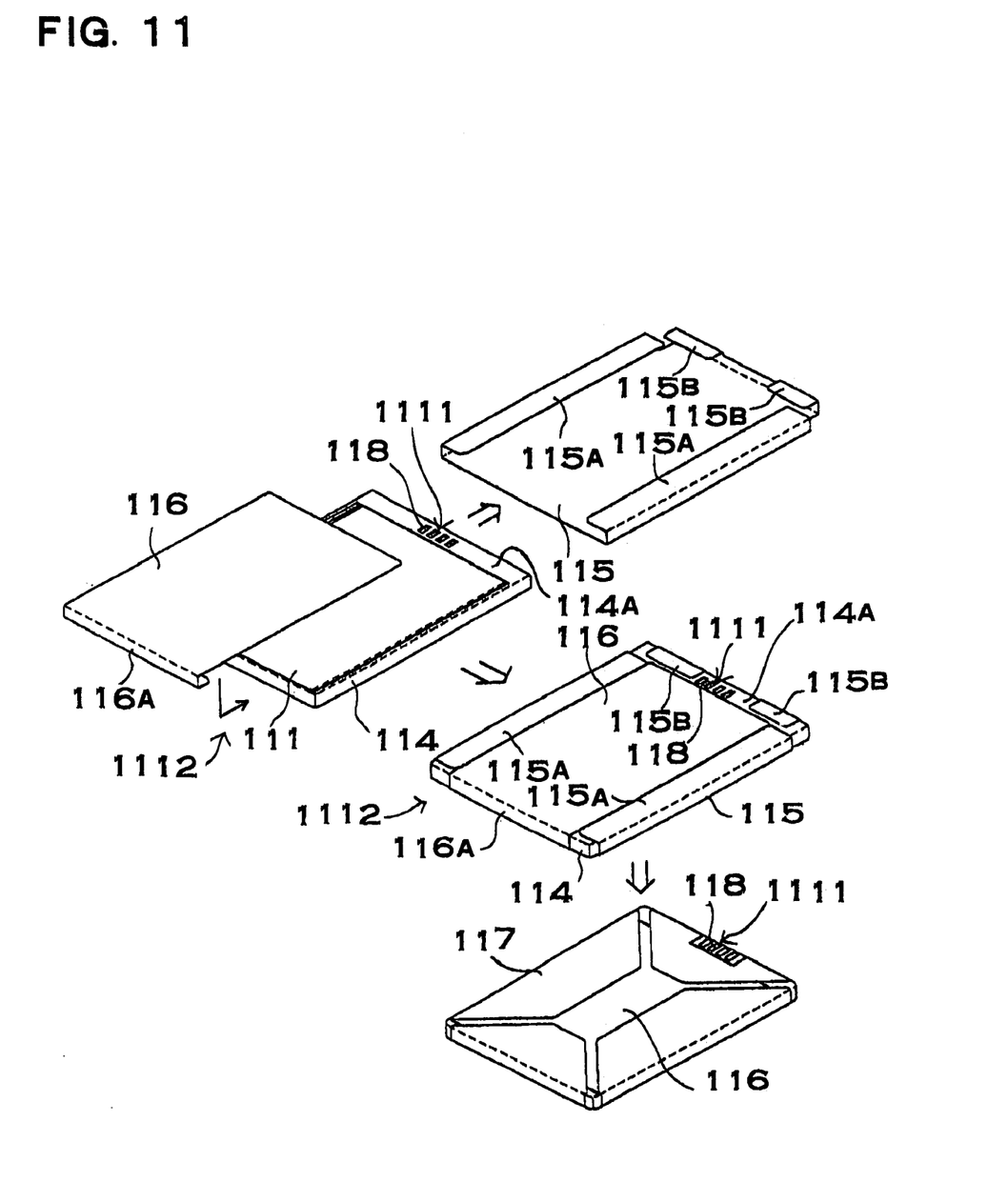
FIG. 11 is an exploded perspective view of a battery pack according to still another embodiment of the invention.

In the second metal plate 106, 116 shown in FIG. 10 and FIG. 11, one end section thereof is bent to form a vertical wall 106A, 116A for covering the end section of the framed battery unit 1012, 1112. The vertical wall 106A, 116A protects one end section of the framed battery unit 1012, 1112, that is, an end section which is opposite to the end section to be inserted into the channel-form bent section 105B, 115B of the first metal plate 105, 115. The vertical wall 106A shown in FIG. 10 is formed by bending the second metal plate 106 into an L-shaped form, and protects a bottom rim of the framed battery unit 1012. The vertical wall 116A shown in FIG. 11 is bent into a U-shaped form, and protects the bottom section of the framed battery unit 1112.

Figure 12:
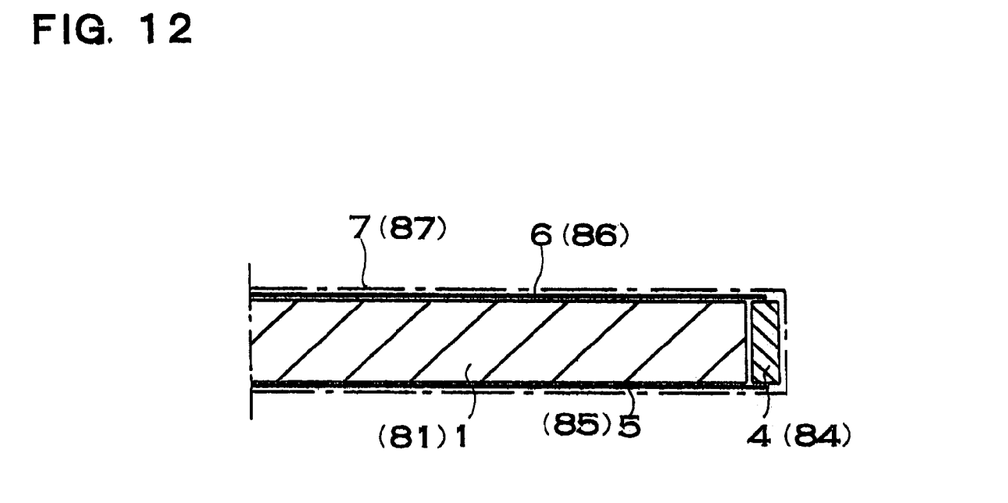
FIG. 12 is a sectional view showing a structure of a bottom section of the battery pack shown in FIG. 5 and FIG. 8.
Figure 13:
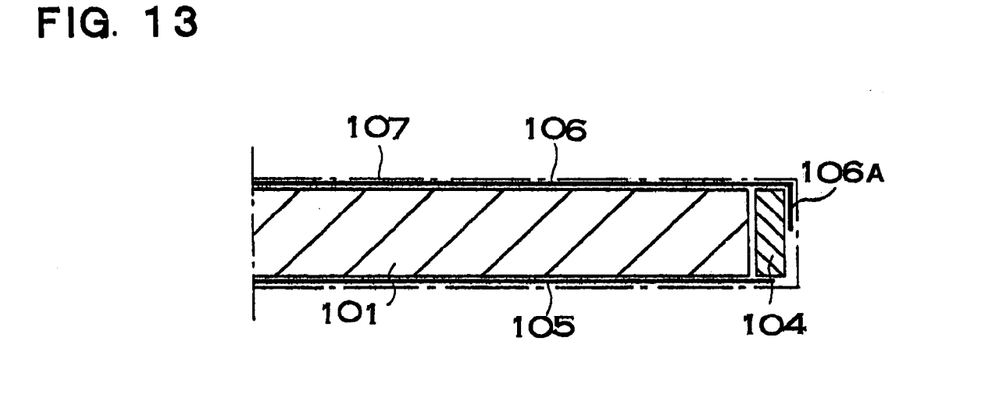
FIG. 13 is a sectional view showing a structure of a bottom section of the battery pack shown in FIG. 10.
Figure 14:
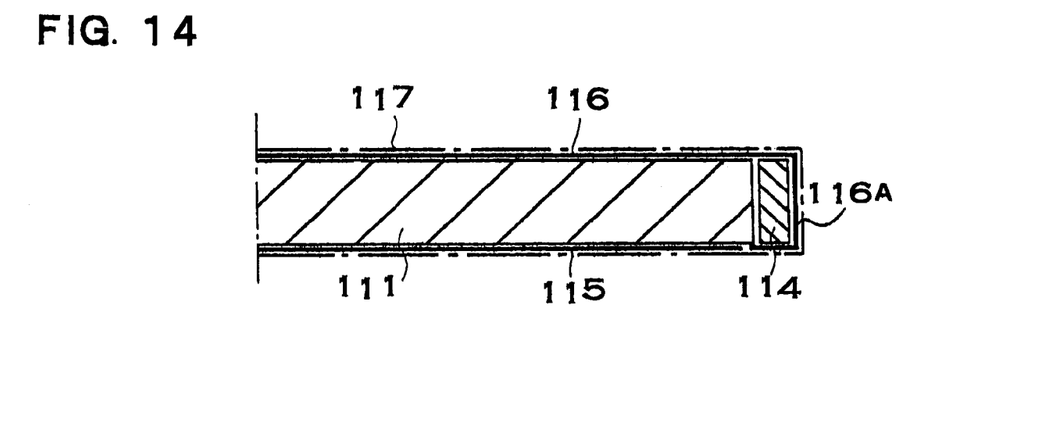
FIG. 14 is a sectional view showing a structure of a bottom section of the battery pack shown in FIG. 11

FIG. 12 to FIG. 14 show the states in which the first metal plate 5, 85, 105, 115 and the second metal plate 6, 86, 106, 116 cover the bottom section of the framed battery unit 12, 812, 1012, 1112. FIG. 12 illustrates a structure of the bottom section of the battery pack shown in FIG. 5 and FIG. 8, wherein the second metal plate 6, 86 protects the front surface of the framed battery unit 12, 812 and the first metal plate 5, 85 protects the rear surface of the framed battery unit 12, 812. FIG. 13 illustrates a structure of the bottom section of the battery pack shown in FIG. 10, wherein the second metal plate 106 protects the bottom section of the framed battery unit 1012. FIG. 14 illustrates a structure of the bottom section of the battery pack shown in FIG. 11, wherein the second metal plate 116 protects the bottom section of the framed battery unit 1112 and a part of the front surface of the first sheathing film. In the battery pack shown in FIG. 14, the first metal plate 115 protects the rear surface of the framed battery unit 1112. Though not illustrated in the drawings, the first metal plate can be provided with a vertical wall at an end section opposite to the section provided with the channel-form bent section, so that the bottom section of the framed battery unit can be protected by this vertical wall provided at the first metal plate.

The battery pack described above protects the front surface without laminating the first metal plate 5, 85, 105, 115 and the second metal plate 6, 86, 106, 116 on the front surface of the framed battery unit 12, 812, 1012, 1112. In the battery pack shown in FIG. 10 and FIG. 11, the side walls 105A, 115A of the first metal plate 105, 115 are formed into the U-shaped form so that a part of the second sheathing film is covered by the first metal plate 105, 115, and accordingly, a width of the second metal plate 106, 116 constitutes a width for allowing the second metal plate 106, 116 to be inserted between the side walls 105A, 115A. In the battery pack with the aforementioned structure, since the first metal plate 5, 85, 105, 115 and the second metal plate 6, 86, 106, 116 are not laminated, the overall structure can be made thinner. Incidentally, the thin metal plate can be used for the first metal plate and the second metal plate, and the metal plates are configured to be partially laminated. In this battery pack, for example, both the first metal plate and the second metal plate are provided with the side walls, and under the condition that these side walls are laminated, both surfaces of the framed battery unit can be covered by the first metal plate and the second metal plate. The side walls of the first metal plate and the second metal plate laminated with each other can be made either into the L-shaped bent form or into the U-shaped bent form. In particular, the structure in which the side wall of the metal plate lapped outside is made into the U-shaped form has an advantageous feature in that the framed battery unit can be held from both sides by the first metal plate and the second metal plate, to thereby be securely protected.

Furthermore, although both surfaces of the framed battery unit are covered and protected by the first metal plate 5, 85, 105, 115 and the second metal plate 6, 86, 106, 116 in the battery pack described above, four corners of the framed battery unit 12, 812, 1012, 1112 are not covered, and the plastic frame 4, 84, 104, 114 at these portions is exposed. The battery pack with this structure has an advantage of reliably preventing corner sections from being deformed in case the battery pack is inadvertently dropped. That is, in case the metal plate is located at the corner section, the metal plate does not return to an original form if deformed due to the fall; but the plastic frame can return to the original form even if being momentarily deformed. In the first metal plate in the drawings, corner sections thereof at the channel-form bent sections 5B, 85B, 105B, 115B side are notched, in other words, they are bent such that end rims of the side walls 5A, 85A, 105A, 115A and the channel-form bent sections 5B, 85B, 105B, 115B are away from the corners of the framed battery unit 12, 812, 1012, 1112, to thereby expose the plastic frame 4, 84, 104, 114 at these portions. Furthermore, the entire length of the first metal plate is made shorter than the length of the framed battery unit 12, 812, 1012, 1112, so as to expose the plastic frames 4, 84, 104, 114 at corner sections located opposite to the side of the channel-form bent sections 5B, 85B, 105B, 115B. Also, the width of the second metal plate is configured so as to be narrower than the width of the framed battery unit 12, 812, 1012, 1112, to thereby expose the plastic frame 4, 84, 104, 114 at corner sections located opposite to the side of the channel-form bent sections 5B, 85B, 105B, 115B. Incidentally, it is not always necessary to configure the length of the first metal plate and the width of the second metal plate to be smaller than those of the framed battery unit, and the plastic frame at the corner sections can be exposed by providing notches at the corner sections.

The label 7, 87, 107, 117 constitutes an insulating sheet, and adheres to the front surfaces of the first metal plate 5, 85, 105, 115 and the second metal plate 6, 86, 106, 116, to thereby insulate the front surface of the battery pack. Further, printing is conducted on the label 7, 87, 107, 117 to decorate the front surface of the battery pack, and by printing necessary symbols and characters, the label 7, 87, 107, 117 displays these symbols and characters. The label 7, 87, 107, 117 adheres to the front surfaces of the metal plates by means of an adhesive, or is bonded to the front surfaces of the metal plates by means of an adhesive layer. The label 7, 87, 107, 117 in the drawings is bonded such that portions of the label 7, 87, 107, 117 are not lapped with each other even at the second sheathing film side of the framed battery unit 12, 812, 1012, 1112.

In the battery pack described above, the polymer battery 1, 81, 101, 111 is encased in the plastic frame 4, 84, 104, 114 to thereby constitute the framed battery unit 12, 812, 1012, 1112. The battery pack can be configured such that the outer periphery thereof is protected by both the plastic frame and the metal plates. Incidentally, the battery pack of the invention can be configured such that the front surface thereof is protected by the first metal plate and the second metal plate without inserting the polymer battery into the plastic frame. This is because the outer periphery of the polymer battery can be protected by the first metal plate and the second metal plate. The battery pack without the plastic frame can employ the simple overall structure. In this battery pack, the first metal plate and the second metal plate are bent along the outer periphery of the polymer battery, to thereby protect the polymer battery.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or the equivalence of such metes and bounds thereof are therefore intended to be embraced by the claims.

What is claimed is:

1. A battery pack comprising:
 a laminate battery having a built-in electrode interposed between a first sheathing film and a second sheathing film, said first sheathing film and the second sheathing film being lapped along an outer periphery of the electrode to thereby form lap sections, said lap sections being connected to hold the electrode inside of the laminate battery;
 a terminal substrate disposed at the lap sections of the laminate battery and including output terminals at a front surface side thereof;
 a substrate holder disposed between a rear surface of the terminal substrate and the lap sections of the laminate battery; and
 a first metal plate laminated on a first sheathing film side of the laminate battery;
 wherein said terminal substrate is supported by the substrate holder, the lap sections and the first metal plate, said output terminals of the terminal substrate being disposed at a position near a same plane as a front surface of the second sheathing film by means of the substrate holder.

2. A battery pack as recited in claim 1, wherein the lap sections of said laminate battery located at both sides of the electrode are bent along end surfaces of the electrode, said laminate battery being fitted inside a plastic frame having two open surfaces to thereby constitute a framed battery unit, said first metal plate and a second metal plate covering both surfaces of the framed battery unit.

3. A battery pack as recited in claim 1, wherein said first sheathing film of said laminate battery has a planate form, said second sheathing film being bent along peripheries of said electrode, said second sheathing film being connected to said first sheathing film at the lap sections.

4. A battery pack as recited in claim 2, wherein said plastic frame includes a cover frame for covering the front surface side of said terminal substrate, said cover frame being perforated with contact windows for exposing the output terminals.

5. A battery pack as recited in claim 2, wherein at least one of said first metal plate and said second metal plate include side walls for covering one side or both sides of said framed battery unit.

6. A battery pack as recited in claim 2, wherein a channel-form bent section formed by being bent into a U-shaped form is provided at an end section of said first metal plate, said framed battery unit being fitted into the channel-form bent section.

7. A battery pack as recited in claim 2, wherein side walls, provided at both sides of said first metal plate, are each bent into a U-shaped form, said framed battery unit being fitted into said side walls.

8. A battery pack as recited in claim 2, wherein said first metal plate includes side walls for covering both sides of said framed battery unit and a channel-formed bent section for covering one end of said framed battery unit, said second metal plate including a vertical wall for covering the other end of said framed battery unit, said side walls surrounding said both sides of said framed battery unit, said channel-form bent section surrounding said one end of said framed battery unit, said vertical wall surrounding the other end of said framed battery unit.

9. A battery pack as recited in claim 2, wherein four corners of said plastic frame are exposed at four corners of said framed battery unit formed by covering said both surfaces thereof with said first metal plate and said second metal plate.

10. A battery pack as recited in claim 1, wherein an electronic component for achieving a protective circuit of said laminate battery is mounted on said terminal substrate, said electronic component being fixed so as to protrude at the rear surface of said terminal substrate, said electronic component at the rear surface of said terminal substrate being disposed at a hollow section provided at an upper surface of said substrate holder.

11. A battery pack as recited in claim 1, wherein said substrate holder is integrally formed of a plastic in its entirety, said substrate holder being provided with a peripheral wall and a protrusion to increase a substantial thickness thereof so that the output terminals are placed on the same plane as the second sheathing film.

12. A battery pack as recited in claim 10, wherein said substrate holder is integrally formed of a plastic in its entirety, said substrate holder being provided with a peripheral wall, a protrusion, and a hollow section formed between the peripheral wall and the protrusion, said electronic component fixed at the rear surface of said terminal substrate being disposed at said hollow section of said substrate holder.

13. A battery pack comprising:
 a polymer battery having a built-in electrode interposed between a first sheathing film and a second sheathing film, said first sheathing film and said second sheathing film being lapped along an outer periphery of said electrode to thereby form lap sections, said lap sections being connected to hold the electrode inside of said polymer battery;
 a terminal substrate disposed at the lap sections of said polymer battery and including output terminals at a front surface side thereof;
 a substrate holder disposed between a rear surface of said terminal substrate and the lap sections of said polymer battery; and
 a first metal plate laminated on a first sheathing film side of said polymer battery;
 wherein said terminal substrate is supported by said substrate holder, the lap sections and said first metal plate, said output terminals of said terminal substrate being disposed at a position so as to be close to a same plane as a front surface of said second sheathing film by means of said substrate holder.

14. A battery pack as recited in claim 13, wherein the lap sections of said polymer battery located at both sides of said electrode are bent along end surfaces of said electrode, said polymer battery being fitted inside a plastic frame having two open surfaces to thereby constitute a framed battery unit, said first metal plate and a second metal plate covering both surfaces of said framed battery unit.

15. A battery pack as recited in claim 13, wherein said first sheathing film of said polymer battery has a planate form, said second sheathing film being bent along peripheries of said electrode, said second sheathing film being connected to said first sheathing film at the lap sections.

16. A battery pack as recited in claim 14, wherein said plastic frame includes a cover frame for covering the front surface side of said terminal substrate, said cover frame being perforated with contact windows for exposing the output terminals.

17. A battery pack as recited in claims 14, wherein at least one of the first metal plate and the second metal plate include side walls for covering one side or both sides of the framed battery unit.

18. A battery pack as recited in claim 14, wherein a channel-form bent section formed by being bent into a U-shaped form is provided at an end section of said first metal plate, said framed battery unit being fitted into the channel-form bent section.

19. A battery pack as recited in claim 14, wherein side walls provided at both sides of said first metal plate are bent into a U-shaped form, said framed battery unit being fitted into said side walls.

20. A battery pack as recited in claim 14, wherein said first metal plate includes side walls for covering both sides of said framed battery unit and a channel-formed bent section for covering one end of said framed battery unit, said second metal plate including a vertical wall for covering the other end of said framed battery unit, said side walls surrounding said both sides of said framed battery unit, said channel-form bent section surrounding the one end of said framed battery unit, said vertical wall surrounding the other end of said framed battery unit.

21. A battery pack as recited in claim 14, wherein four corners of the plastic frame are exposed at four corners of said framed battery unit formed by covering said both surfaces thereof with said first metal plate and said second metal plate.

22. A battery pack as recited in claim 13, wherein an electronic component for achieving a protective circuit of said polymer battery is mounted on said terminal substrate, said electronic component being fixed so as to protrude at the rear surface of said terminal substrate, said electronic component at the rear surface of said terminal substrate being disposed at a hollow section provided at an upper surface of said substrate holder.

23. A battery pack as recited in claim 13, wherein said substrate holder is integrally formed of a plastic in its entirety, said substrate holder being provided with a peripheral wall and a protrusion to increase a substantial thickness thereof so that said output terminals are placed on the same plane as said second sheathing film.

24. A battery pack as recited in claim 22, wherein said substrate holder is integrally formed of a plastic in its entirety, said substrate holder being provided with a peripheral wall, a protrusion, and a hollow section formed between the peripheral wall and the protrusion, said electronic component fixed at the rear surface of the terminal substrate being disposed at said hollow section of said substrate holder.

* * * * *